United States Patent
Xiong et al.

(10) Patent No.: US 12,289,140 B2
(45) Date of Patent: Apr. 29, 2025

(54) DEVICES AND METHODS FOR NEAR-FIELD COMMUNICATION DETECTION

(71) Applicant: STMicroelectronics (China) Investment Co., Ltd., Shanghai (CN)

(72) Inventors: Tianhao Xiong, Shanghai (CN); Dongyang Tian, Suzhou (CN); Gang Wu, Shanghai (CN)

(73) Assignee: STMICROELECTRONICS (CHINA) INVESTMENT CO., LTD., Shanghai (CN)

( * ) Notice: Subject to any disclaimer, the term of this patent is extended or adjusted under 35 U.S.C. 154(b) by 0 days.

(21) Appl. No.: 17/796,410

(22) PCT Filed: Jan. 29, 2020

(86) PCT No.: PCT/CN2020/074070
§ 371 (c)(1),
(2) Date: Jul. 29, 2022

(87) PCT Pub. No.: WO2021/151229
PCT Pub. Date: Aug. 5, 2021

(65) Prior Publication Data
US 2024/0297682 A1    Sep. 5, 2024

(51) Int. Cl.
*H04B 5/77* (2024.01)
(52) U.S. Cl.
CPC ....................... *H04B 5/77* (2024.01)
(58) Field of Classification Search
CPC ....................................... H04B 5/77
USPC ......................................... 455/41.1
See application file for complete search history.

(56) References Cited

U.S. PATENT DOCUMENTS

| | | | |
|---|---|---|---|
| 8,792,824 B2 | 7/2014 | Moosavi | |
| 9,654,181 B1 | 5/2017 | Wobak et al. | |
| 10,164,600 B2 | 12/2018 | Kormann et al. | |
| 2005/0135817 A1 | 6/2005 | Harms et al. | |
| 2006/0244630 A1 | 11/2006 | Finkenzeller | |
| 2011/0205026 A1* | 8/2011 | Bateman | G06K 7/10316 340/10.1 |
| 2012/0208459 A1* | 8/2012 | Burtt | H04B 5/72 455/41.1 |

(Continued)

FOREIGN PATENT DOCUMENTS

| | | |
|---|---|---|
| EP | 1545028 A2 | 6/2005 |
| JP | 2005323178 A | 11/2005 |

(Continued)

*Primary Examiner* — Mong-Thuy T Tran
(74) *Attorney, Agent, or Firm* — SLATER MATSIL, LLP

(57) ABSTRACT

In one aspect, the NFC device includes an antenna that includes first and second terminals, a first resistor on a first current path, and a second resistor on a second current path. The NFC device includes a first switch that switches between open and closed states, where the first switch couples the first current path to the first terminal in the closed state. The NFC device includes a second switch that switches between open and closed states, where the second switch couples the second current path to the second terminal in the closed state. The NFC device includes a controller in communication with the first and second switches and configured to set a Q factor of the antenna to a first or second value by operating the first and second switches.

24 Claims, 9 Drawing Sheets

(56) References Cited

U.S. PATENT DOCUMENTS

| | | |
|---|---|---|
| 2013/0115876 A1 | 5/2013 | McFarthing |
| 2014/0323043 A1* | 10/2014 | Shana'a .................. H04B 5/72 |
| | | 455/41.1 |
| 2014/0354360 A1* | 12/2014 | Hayashi ............. H03F 3/45183 |
| | | 330/261 |
| 2015/0303997 A1 | 10/2015 | Dhayni |
| 2016/0019766 A1* | 1/2016 | Padula ............... G08B 13/2477 |
| | | 340/572.1 |
| 2017/0104468 A1* | 4/2017 | Kormann ........... G06K 7/10217 |
| 2017/0288734 A1* | 10/2017 | Zhou ....................... H04B 5/77 |

FOREIGN PATENT DOCUMENTS

| | | | |
|---|---|---|---|
| WO | 2009128032 A1 | 10/2009 | |
| WO | WO-2011041849 A1 * | 4/2011 | ........... G06K 7/0008 |

* cited by examiner

DEVICES AND METHODS FOR NEAR-FIELD COMMUNICATION DETECTION

CROSS-REFERENCE TO RELATED APPLICATIONS

This application is a national stage application of International Application No. PCT/CN2020/074070, filed on Jan. 29, 2020, which application is hereby incorporated herein by reference.

TECHNICAL FIELD

The present disclosure relates to the field of near-field communications (NFC) devices, and in particular to a devices and methods for NFC detection.

BACKGROUND

Generally, near-field communication allows wireless and contactless communication between devices in range of each other. A considerable amount of energy resources may be expended to detect other devices. And, efforts to reduce energy consumption can adversely impact the detection range of near-field communication devices. Near-field communication devices can benefit from reducing the amount of energy expended to detect other devices, improving the range of detection, or both.

SUMMARY

In accordance with an embodiment of the present invention a near-field communications (NFC) device includes an antenna that includes a first terminal and a second terminal. The NFC device includes a first resistor on a first current path. The NFC device includes a second resistor on a second current path. The NFC device includes a first switch. The first switch is configured to switch between an open state and a closed state, wherein the first switch couples the first current path to the first terminal in the closed state. The NFC device includes a second switch. The second switch is configured to switch between an open state and a closed state, where the second switch couples the second current path to the second terminal in the closed state. The NFC device may include a controller in communication with the first switch and the second switch. The controller may be configured to set a Q factor of the antenna to a first value or a second value by operating the first switch and the second switch.

In accordance with an embodiment of the present invention an NFC device includes an antenna comprising a Q factor. The NFC device includes a first current transmission path coupled with a first terminal of the antenna. The NFC device includes a second current transmission path coupled with a second terminal of the antenna. The NFC device includes a resistor and a switch disposed between the first current transmission path and the second current transmission path. The switch is operable to couple the resistor between the first current transmission path and the second current transmission path in an open state and decouple the resistor between the first current transmission path and the second current transmission path in a closed state. The NFC device may include a controller in communication with the switch. The controller may be configured to set the Q factor to a first value or a second value by operating the switch.

In accordance with an embodiment of the present invention a method for conserving power for a near-field communications NFC includes setting a Q factor of an antenna to a first value for detecting an NFC tag; setting the Q factor of the antenna to a second value for a communication with the NFC tag when the NFC tag is in a communication range of the NFC device; and resetting the Q factor of the antenna to the first value when the communication is complete.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
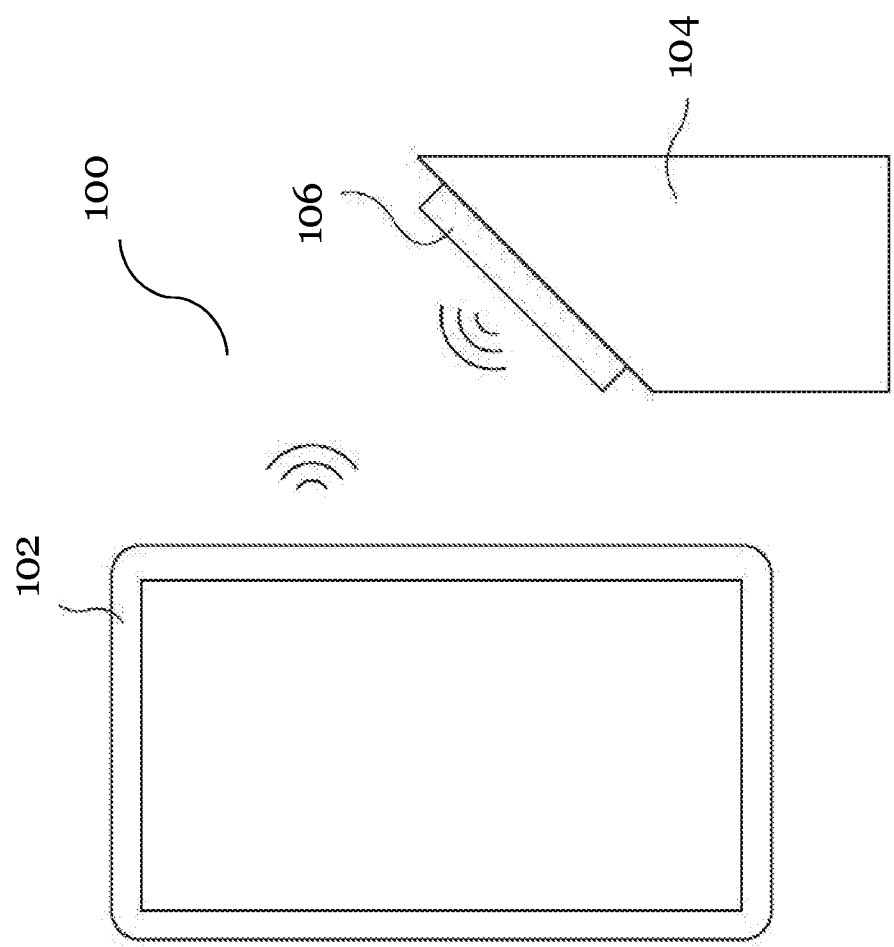
FIG. 1 depicts an embodiment of an NFC communication system.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Contactless or wireless communication is generally carried out between a reader and an object, for example, a transponder of the tag type, a contactless smartcard, or mobile telephone emulated in a card mode. These examples are not to be limiting. The reader may also, by way of non-limiting example, comprise a mobile telephone or other device that has been emulated in a reader mode.

Near-field communications, better known by those skilled in the art under the acronym NFC, is a technology for wireless connectivity which allows communications over a short distance. The range for communication may vary from system to system. But, in some embodiments, communications may occur in a range of approximately 10 cm.

As will be described in more detail below, embodiments of this application improve detection distance of a NFC object (tag) to a card reader while maintaining or reducing the energy consumed by the reader by using a dynamic Q-factor of an antenna within the reader. In embodiments, this may be accomplished without impacting regular operation of the NFC object and the reader. Accordingly, embodiments of the invention may be applicable in applications for low power consumption and improved detection distance.

Some examples of NFC devices include, but are not limited to, contactless smartcards, mobile telephones or tablets emulated in a card mode, and NFC readers. NFC technology is particularly suited to connecting many types of user devices and enables fast and easy communication.

A contactless object is an object capable of exchanging information via an antenna with another contactless object, for example, a reader. The information may be exchanged according to a contactless communications protocol.

An NFC object, which is a contactless object, is an object compatible with NFC technology. NFC technology is an open technology platform standardized in the standards ISO/IEC 18092 and ISO/IEC 21481 but incorporates numerous already-existing standards such as the Type A and Type B protocols defined in the standard ISO-14443, which may provide communication protocols for NFC technology. Additionally, Type F protocols are based on FeliCA JIS 6319-4. Among other things, these protocols may require a minimum bandwidth for different rates of data transfer between readers and tags or devices emulating tags.

There are at least five basic types of passive NFC tags including Type 1, Type 2, Type 3, Type 4, and Type 5. Different types of NFC tags are associated with different technology standards. ISO-14443 A applies to Type 1 and Type 2. ISO-14443 A and ISO-14443 B apply to Type 4. And, JIS 63194 applies to Type 3. ISO/IEC 15693 applies to Type 5 tags.

The different types of tags may also allow data transmission at different rates. Data may be transmitted at 106 kb/s, 212, kb/s, 424 kb/s, 848 kb/s, or at other speeds. And, the protocols set by the applicable standards for NFC communication regarding bandwidth and stability requirements for NFC communication depending on the data transmission rate are intended to improve the robustness of communications while reducing detuning sensitivity.

As mentioned above, a cellular mobile telephone may be used (if it is equipped with specific means or circuitry) for exchanging information with another contactless device like a contactless reader or other mobile device. Such communications are also subject to the contactless communication protocol used in NFC technology.

Using a cellular mobile telephone for contactless communication allows information to be exchanged between the contactless reader and secure elements situated in the mobile telephone. Numerous applications are thus possible, such as mobile ticketing in public transportation (the mobile telephone functions as a travel ticket) or mobile payments (the mobile telephone functions as a payment card). Other devices such a tablet may also be configured to exchange information with a contactless reader.

When information is transmitted between a reader and an object emulated in a tag or card mode, the reader generates a magnetic field by its antenna which, in the standards conventionally used, operates at a frequency of 13.56 MHz. However, embodiments of the present application are not limited to a frequency range.

On the other side, the antenna of the object emulating the tag modulates the field generated by the reader. This modulation is carried out by modifying the load connected to the terminals of the antenna of the object.

By modifying the load across the terminals of the antenna of the object, the output impedance of the antenna of the reader changes due to the magnetic coupling between the two antennas. This results in a change in the amplitudes and/or the phases of the voltages and currents present on and in the antennas of the reader and of the object. Therefore, in this way, the information to be transmitted from the object to the reader is transmitted via load modulation to the antenna of the reader.

NFC tags may perform active or passive modulation to transmit information to the reader. In passive modulation, the tag utilizes energy carried in the magnetic field that is emitted by the reader to power the modulation. In active modulation, the tag may comprise its own energy source to power the modulation. The tag may be configured to perform either or both types of modulation.

FIG. 1 illustrates an embodiment of an example NFC system for contactless communication. A tag 102 is located in a communication range of a reader 104 where an inductive coupling between the tag 102 and the reader 104 may occur. A transponder 106 of the reader emits a magnetic field that is modulated in turn by the tag 102.

The system 100 depicted in FIG. 1 may comprise an active or passive load modulation system. The tag 102 may comprise a passive tag or a device, for example a mobile phone or tablet, in a tag emulation mode. The tag 102 depicted in FIG. 1 may also comprise any type of NFC tag in various embodiments. In some embodiments, the reader 104 may comprise a device like a mobile phone or a tablet configured to operate as a reader. In some embodiments, the reader 104 may comprise a dedicated reader device.

The reader 104 may be configured to communicate with any, or all, types of tag 102. So, it may be configured to comply with the different communication protocols when communication occurs between the reader 104 and the different types of tag 102. Different types of tags may communicate at different data rates. And, generally, the higher the data rate, the higher the requirements by the applicable protocols for stability and bandwidth of the communication.

Because of these requirements, the quality factor, or Q factor allowable by the protocols varies inversely with data transmission rate. The Q factor decreases as bandwidth and detuning sensitivity decrease. Table 1 below shows suggested initial values for the Q factor of an NFC antenna of a reader that may be appropriate for different data transmission rates to meet the applicable communication protocols.

TABLE 1

| Q factor | 106 kb/s | 212 kb/s | 424 kb/s | 848 kb/s |
|---|---|---|---|---|
| 10 | X | X | X | X |
| 15 | X | X | X | |
| 20 | X | X | | |
| 25 | X | | | |

In various embodiments, the reader 104 may generate a communication transmission after a tag 102 has been detected in range of the reader 104. This may reduce power consumption of the reader 104 because it may allow the reader 104 to avoid continuously generating the magnetic field necessary for modulation by a tag 102 when there is no tag 102 to receive a communication.

But, to communicate with an NFC object, the reader 104 must undertake a detection process to determine whether there are any NFC objects in range of the reader 104. Searching for an NFC object uses the energy resources of the reader 104. And, this may undermine efforts to reduce energy consumption by avoiding the unnecessary generation of a magnetic field for communication.

In some cases, the reader 104 may comprise embodiments that are powered by batteries. Battery-powered readers have a limited energy supply. And, the detection process may drain the energy supply of the reader 104. Some examples of battery-powered readers include, but are not limited, to mobile phones or other mobile devices, automotive door handles, and smart locks.

Various methods and devices known in the art have been developed to limit the power consumption of an NFC reader. In some cases, the tag detection may use less energy than communication, but the area of the detection range may suffer as low power methods are implemented.

In some embodiments, the reader 104 may be configured to detect a tag 102 from the detuning of the antenna of the reader 104. The presence of the tag 102 in a vicinity of the reader 104 can impact the magnetic field produced by the reader 104 and cause detuning of the antenna of the reader 104. This could cause a change in amplitude, a phase shift, or both that can be detected by an NFC chip of the reader 104. The higher the value of the Q factor of the antenna of the reader 104, the more sensitive an antenna is a detuning effect caused by a tag 102 in the area of the reader 104.

However, as mentioned elsewhere, the protocols for NFC communication may impose limitations on the magnitude of the value of the Q factor of an antenna for a communication at a given data rate. In some cases, this may result in a reader 104 that cannot detect a tag 102 that is close enough to communicate with the reader 104.

Figure 2:
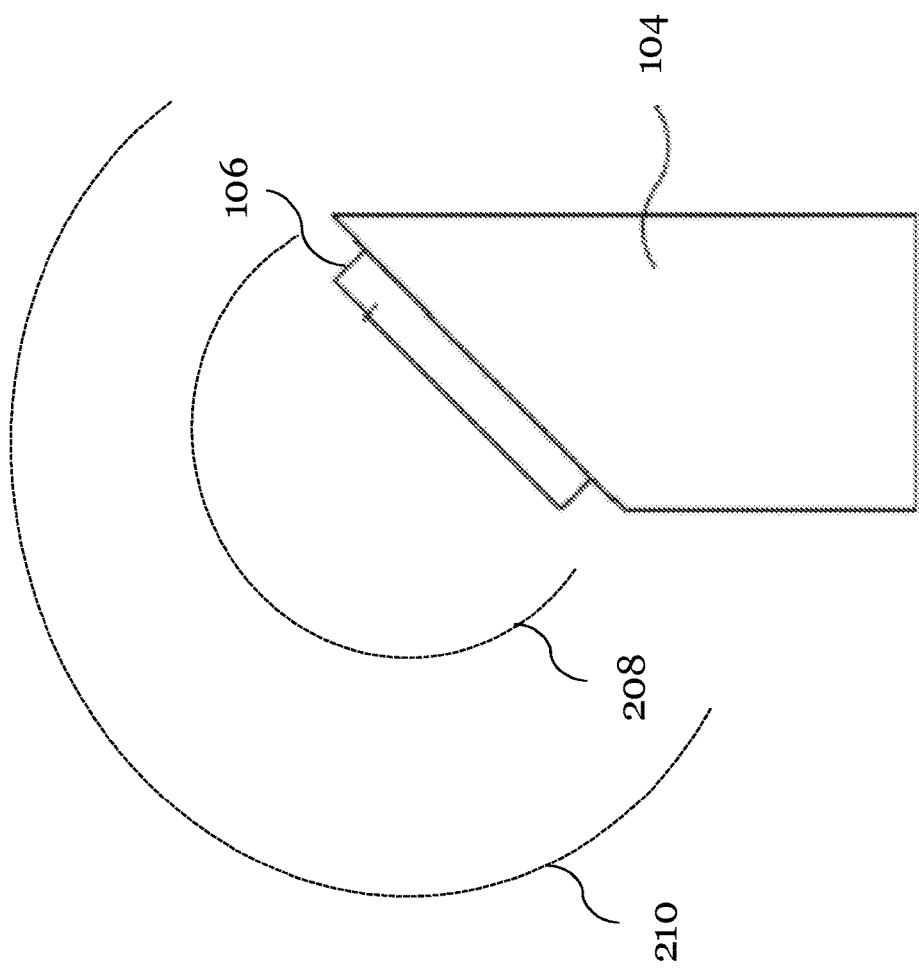
FIG. 2 illustrates an example of a reader with a limited detection range.

FIG. 2 illustrates an example of a reader 104 with a limited detection range 208. The reader 104 of FIG. 2 has a detection range 208 where it is able to detect a tag 102. The reader 104 has a communication range 210 where it can communicate with a tag 102. As FIG. 2 illustrates, the detection range 208 is smaller than the communication range 210 of the reader 104. A tag 102 located inside the communication range 210 may not be detected if the tag 102 is located outside the detection range 208.

Increasing the value of the Q factor of the antenna of a reader 104 may allow the reader 104 to expand its detection range 208 while maintaining or reducing energy consumption.

Figure 3:
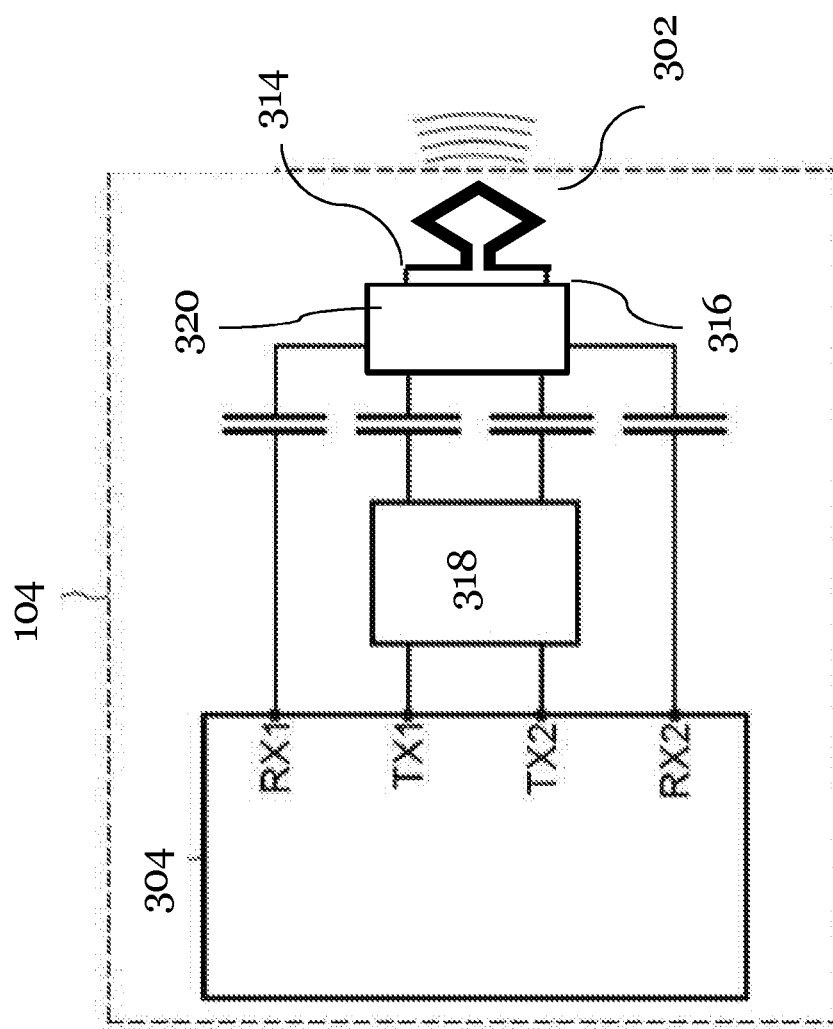
FIG. 3 depicts an embodiment of a reader that allows the Q factor of an antenna to be dynamically modified.

FIG. 3 illustrates an embodiment of a reader 104 that allows the value of the Q factor of an antenna 302 to be dynamically modified. In various embodiments, this allows the value of the Q factor to be increased, or set to a high level, when the reader 104 is detecting a tag 102. The detection range 208 of the reader 104 may be expanded by at least 80% in some embodiments while maintaining or reducing the energy consumption of the reader 104. Dynamic modification of the value of the Q factor also allows the value to be reduced once a tag 102 is detected and a communication begins to meet the applicable bandwidth and stability protocols.

The reader 104 may comprise an NFC chip 304. In various embodiments, the NFC chip 304 comprises a first output terminal TX1 and a second output terminal TX2. The antenna 302 may comprise a first terminal 314 and a second terminal 316. Output data is transmitted from the first output terminal TX1 and the second output terminal TX2 of the NFC chip 304 to the first terminal 314 and the second terminal 316 of the antenna 302. The output data may be used to modulate the magnetic field produced by the reader 104 from the antenna 302 to communicate with a tag 102.

In some embodiments, the NFC chip 304 may also comprise a first input terminal RX1 and a second input terminal RX2. Input data may be transmitted from the first terminal 314 and the second terminal 316 of antenna 302 to the first input terminal RX1 and the second input terminal RX1 of the NFC chip 304. In some embodiments, the input data comprises information passed to the reader 104 by modulation of the tag 102.

In some embodiments, the reader 104 may comprise a transmitting antenna for outgoing transmissions and a receiving antenna for incoming transmissions. Output data may be transmitted from the first output terminal TX1 and the second output terminal TX2 of the NFC chip 304 to the terminals of the transmitting antenna for outgoing transmissions. And, input data may be received from the terminals of the receiving antenna for incoming transmissions to the first input terminal RX1 and the second input terminal RX1 of the NFC chip 304.

In various embodiments, the reader 104 may comprise an electromagnetic interference filter, an "EMI filter." EMI filter 318 coupled to the first output terminal TX1 of the NFC chip 304 and the second output terminal TX2 of the NFC chip 304. The EMI filter 318 may filter output data transmitted to the antenna 302 and it may be coupled to the first terminal 314 of the antenna 302, and the second terminal 316 of the antenna 302.

FIG. 3 also depicts a dynamic resistance 320 coupled with the first terminal 314 and the second terminal 316 of the antenna 302. Adding resistance to the antenna 302 will reduce the Q factor of the antenna 302. Similarly, removing resistance from the antenna 302 will increase the Q factor of the antenna 302.

The dynamic resistance 320 may be configured to be decreased or set to a low value when the reader 104 is attempting detect a tag 102. This will increase the value of Q factor of the antenna 302. And, in various embodiments, this may heighten the sensitivity of the antenna 302 to detuning caused by the presence of a tag 102 nearby the reader 104. This may allow the reader 104 to expand its detection range 208 when the value of the Q factor is reduced while operating at a reduced level of energy consumption.

In various embodiments, the dynamic resistance 320 may also be configured to be increased or set to a high value when the reader 104 is communicating with a tag 102 after the tag 102 has been detected by the reader 104. Adding resistance reduces the value of the Q factor of the antenna 302. In embodiments, this may increase the robustness and stability of the communication exchange between the reader 104 and the tag 102. And, it allows the reader 104 to operate according to the appropriate protocols for the data transmission rate of a communication once the communication begins.

Changing the value of the Q factor depending on whether the reader 104 is detecting a tag 102 or communicating with a tag 102 allows the distance of tag detection to be improved without impacting the operation of the tag 102 and reader 104 because the value of the Q factor can be set to appropriate values for communication when the reader 104 is not detecting a tag 102. This may be used in some embodiments for applications that need long detection distances but low power consumption such as car door handles, smart locks and other devices.

In embodiments wherein the reader 104 comprises a transmission antenna for outgoing transmissions and a receiving antenna for incoming transmissions, a dynamic resistance 320 may be provided to the antenna for outgoing transmissions, the antenna for incoming transmissions, or both.

Figure 4:
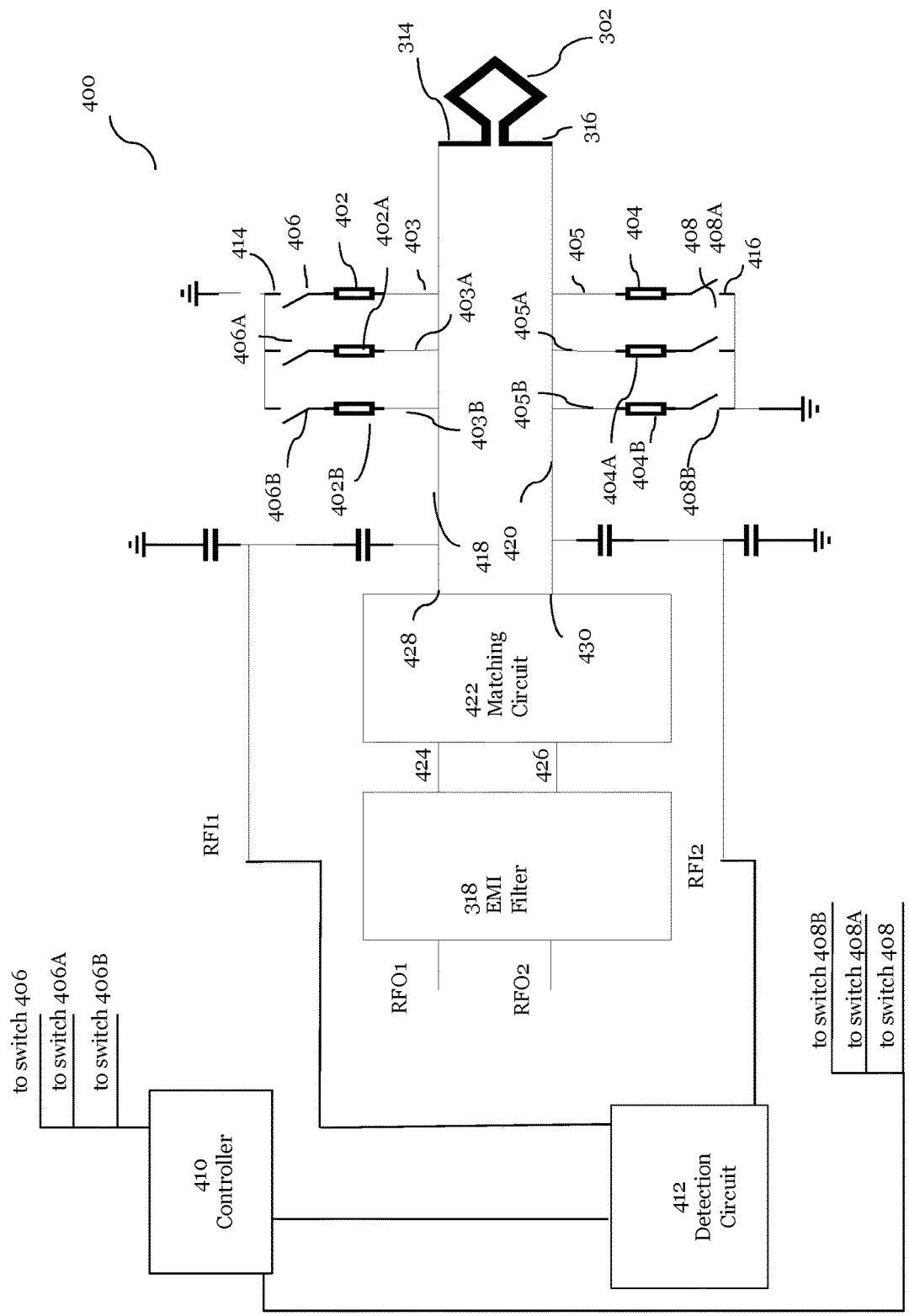
FIG. 4 depicts an embodiment of a circuit that allows the Q factor of an antenna of a reader to be dynamically modified.

FIG. 4 illustrates an embodiment of a circuit 400 that allows the Q factor of an antenna 302 to be dynamically modified by allowing for a dynamic resistance 320. In some embodiments, a first output node RFO1 may be coupled with the first output terminal TX1 of the NFC chip 304 illustrated in FIG. 3. A second output node RFO2 may be coupled with the second output terminal TX2 of the NFC chip 304. A first input node RFI1 may be coupled with the first input terminal RX1 of the NFC chip 304. And, a second input node RFI2 may be coupled with the second input terminal TX2 of the NFC chip 304.

In some embodiments, the circuit 400 comprises a first resistor 402 of a first current path 403. The circuit 400 may further comprise a second resistor 404 of a second current path 405.

In various embodiments, the circuit 400 may further comprise a first switch 406 configured to switch between an open state and a closed state, wherein the first switch 406 couples the first current path 403 to the first terminal 314 of the antenna 302 in the closed state. In the open state the first switch 406 creates a break in the first current path 403.

The circuit 400 may also comprise a second switch 408 configured to switch between an open state and a closed state, wherein the second switch 408 couples the second current path 405 to the second terminal 316 of the antenna 302 in the closed state. In an open state, the second switch 408 creates a break in the second current path 405.

In some embodiments, a controller 410 is in communication with the first switch 406 and the second switch 408. The controller 410 may open the first switch 406 and the second switch 408 to decouple the first current path 403 and the second current path 405 from the antenna 302 and remove resistance from the circuit 400. In doing so, the controller 410 may set the value of the Q factor of the antenna 302 to a high value, which heightens the sensitivity of the antenna 302 to detuning caused by the presence of a tag 102 nearby the antenna 302. As discussed above, this allows a reader 104 to reduce power consumption and increase the detection range 208 when the reader 104 is searching for a tag 102.

The controller 410 may close the first switch 406 and the second switch 408 to couple the first current path 403 and the second current path 405 to the antenna 302 and add resistance to the circuit 400. In doing so, the controller 410 may set the value of the Q factor to a low value while communications occur between the reader 104 and a tag 102 in accordance with the appropriate protocol for the data transfer rate of the communication.

In some embodiments, the circuit 400 may also comprise a third resistor 402A and a fifth resistor 402B of a third current path 403A and a fifth current path 403B respectively. The circuit 400 may further comprise a fourth resistor 404A and a sixth resistor 404B of a fourth current path 405A and a sixth current path 405B.

In various embodiments, the circuit 400 may further comprise a third switch 406A and a fifth switch 406B configured to switch between an open state and a closed state. In embodiments, the third switch 406A couples the third current path 403A to the first terminal 314 of the antenna 302 in the closed state. In an open state, the third switch 406A may create a break in the third current path 403A. In embodiments, the fifth switch 406B couples the fifth current path 403B to the first terminal 314 of the antenna 302 in the closed state. In an open state, the fifth switch 406B may create a break in the fifth current path 403B.

In some embodiments, the circuit 400 may further comprise a fourth switch 408A and a sixth switch 408B configured to switch between an open state and a closed state. In embodiments, the fourth switch 408A couples the fourth current path 405A to the second terminal 316 of the antenna 302 in the closed state. In an open state, the fourth switch 408A may create a break in the sixth current path 405B.

In embodiments, the sixth switch 408B couples the sixth current path 405B to the second terminal 316 of the antenna 302 in the closed state. In an open state, the sixth switch 408B may create a break in the sixth current path 405B.

In some embodiments, a controller 410 is in communication with the third switch 406A, fourth switch 408A, fifth switch 406B, and sixth switch 408B. The controller 410 may open the first switch 406, second switch 408, third switch 406A, fourth switch 408A, fifth switch 406B, and sixth switch 408B to decouple one or more of the first current path 403, the second current path 405, third current path 403A, the fourth current path 405A, fifth current path 403B, and the sixth current path 405B from the antenna 302 and remove the respective resistance from the circuit 400. In doing so, the controller 410 may set the value of the Q factor of the antenna 302 to a range of values. In some embodiments, there also be any number of additional resistors, switches, and current paths. This may permit additional value settings for the Q factor or more accurate control.

In some embodiments, the value of the Q factor set by the controller 410 corresponds to a high value when the reader 104 is detecting a tag 102, or corresponds to one of a group of lower values selected for compliance with the communication protocols of a given data transmission rate.

In various embodiments, the controller 410 may open each of the first switch 406, second switch 408, third switch 406A, fourth switch 408A, fifth switch 406B, and sixth switch 408B so the Q factor is at its highest value while the reader 104 is attempting to detect a tag 102.

The controller 410 may set other Q factor values to correspond to different data transmission rates in accord with the appropriate protocols. In various embodiments, the value of the Q factor may be set to 10 for data transmissions occurring at 848 kb/s, 15 for data transmissions occurring at 424 kb/s, 20 for data transmissions occurring at 212 kb/s, and 25 for data transmissions occurring at 106 kb/s. Different data transmission rates may be needed for different types of tag 102.

In some embodiments, the controller 410 may be in communication with a detection circuit 412. The detection circuit 412 may be configured to detect when a tag 102 is in the detection range 208 of the antenna 302 of the reader 104. If the value of the Q factor is set to a high value, the controller 410 can set the Q factor to a lower value after the detection circuit 412 detects the presence of a tag 102.

In some embodiments, the controller 410 may restore the value of the Q factor to the high value after the communication between the tag 102 and the reader 104 is complete. This may occur, in some embodiments, after a predetermined period of time has elapsed. In some embodiments, the controller 410 may receive a reset signal from the NFC chip 204 after communication has ceased. In some embodiments, the detection circuit 412 may be configured to detect when communication between a tag 102 and the reader 104 has ceased. And, in some embodiments, the controller 410 may cycle through a range of possible values for the Q factor as polling for different types of tags occurs. In some embodiments, the controller 410 may reset the value of the Q factor when the detection circuit 412 determines that the tag 102 is no longer in the range of the antenna 302.

In embodiments, the NFC chip 304 determines the rate of data transmission. The controller 410 may be in communication with the NFC chip 304 and set the value of the Q factor according to the data rate of transmission as determined by the NFC chip 304. In some embodiments, the NFC chip 304 may comprise a lookup table, or other form of memory, that corresponds data transmission rates to the configuration of switches needed to provide a resistance to the antenna 302 to achieve a desired value of the Q factor, which can then be implemented by the controller 410. In some embodiments, the lookup table may be reprogrammed to correspond different configurations of switches with different values for the Q factor if the operational or other conditions change that affect the resistance needed to achieve a desired value for the Q factor.

In various embodiments, communication between the tag 102 and the reader 104 is initiated by the reader 104 so the data transmission rate is known by the reader 104. The controller 410 may thus set the value of the Q factor according to the data transmission rate of the communication. In various embodiments, the controller 410 may be in communication with the NFC chip 304. The NFC chip 304 may establish and drive the rate of data transmission between the tag 102 and reader 104 and the controller 410 may set the value of the Q factor to correspond to the data transmission rate established by the NFC chip 304. As mentioned elsewhere, the NFC chip 304 may comprise the controller 410.

In various embodiments, the detection circuit 412 is configured to detect a tag 102 by sensing changes in amplitude, or phase shifts due to the presence of the tag 102 in a magnetic field emitted by the antenna 302. In some embodiments, the detection circuit 412 may output a signal directly to the controller 410 that may trigger the controller 410 to set the Q factor accordingly. In some embodiments, the detection circuit 412 may output data that is processed before it is passed to the controller 410. In some embodiments, the controller 410 may comprise a microcontroller.

In some embodiments, the NFC chip 304 comprises the detection circuit 412, the controller 410, or both. In various embodiments the detection circuit 412, the controller, or both are not part of the NFC chip 304. The controller 410 may be in direct communication with the detection circuit 412. In some embodiments, the detection circuit 412 is coupled with the first input node RFI1 and the second input node RFI2.

In various embodiments, a matching circuit 422 is coupled to the first output terminal TX1 of the NFC chip 304, the second output terminal TX2 of the NFC chip 304, the first terminal 314 of the antenna 302, and the second terminal 316 of the antenna 302. The matching circuit 422 may match the load of the antenna 302 with the NFC chip 304. The matching circuit 422 may comprise a dynamic matching circuit in some embodiments. And, a matching circuit 422 may also be employed in various embodiments comprising one antenna for outgoing transmissions and one antenna for incoming transmissions.

In various embodiments, the first resistor 402 is disposed between a first node 414 and the first terminal 314 of the antenna 302 on the first current path 403. In various embodiments, the second resistor 404 is disposed between a second node 416 and the second terminal 316 of the antenna 302 on the second current path 405. In embodiments, the first node 414 and the second node 416 are at a reference potential. The reference potential may comprise a ground voltage.

In some embodiments, like depicted in FIG. 4, there is no coupling between the first node 414 and the first output node RFO1. In such embodiments where the first output node RFO1 is coupled with first output terminal TX1 of the NFC chip 304, the first current path 403 runs in parallel to a first current transmission path 418 between the first output terminal TX1 and the first terminal 314 of the antenna 302.

Similarly, in some embodiments like the one depicted in FIG. 4, there is no coupling between the second node 416 and the second output node RFO2. In such embodiments where the second output node RFO2 is coupled with second output terminal TX2 of the NFC chip 304, the second current path 405 runs in parallel to a second current transmission path 420 between the second output terminal TX2 and the second terminal 316 of the antenna 302.

In embodiments like the ones described in the preceding two paragraphs, the controller 410 may operate the first switch 406 and the second switch 408 to add or remove resistance in parallel with the antenna 302 to set the value of the Q factor of the antenna 302.

FIG. 4, also depicts an embodiment of a matching circuit 422. In various embodiments where the first output node RFO1 is coupled with first output terminal TX1 of the NFC chip 304 and the second output node RFO2 is coupled with second output terminal TX2 of the NFC chip 304, the matching circuit 422 may be coupled to the first output terminal TX1 and the second output terminal TX2 at a first input matching node 424 and a second input matching node 426, respectively. The matching circuit 422 may be coupled with the first terminal 314 of the antenna 302 at a first output matching node 428. And, in some embodiments, the matching circuit 422 may be coupled with the second terminal 316 of the antenna 302 at a second output matching node 430.

Figure 5:
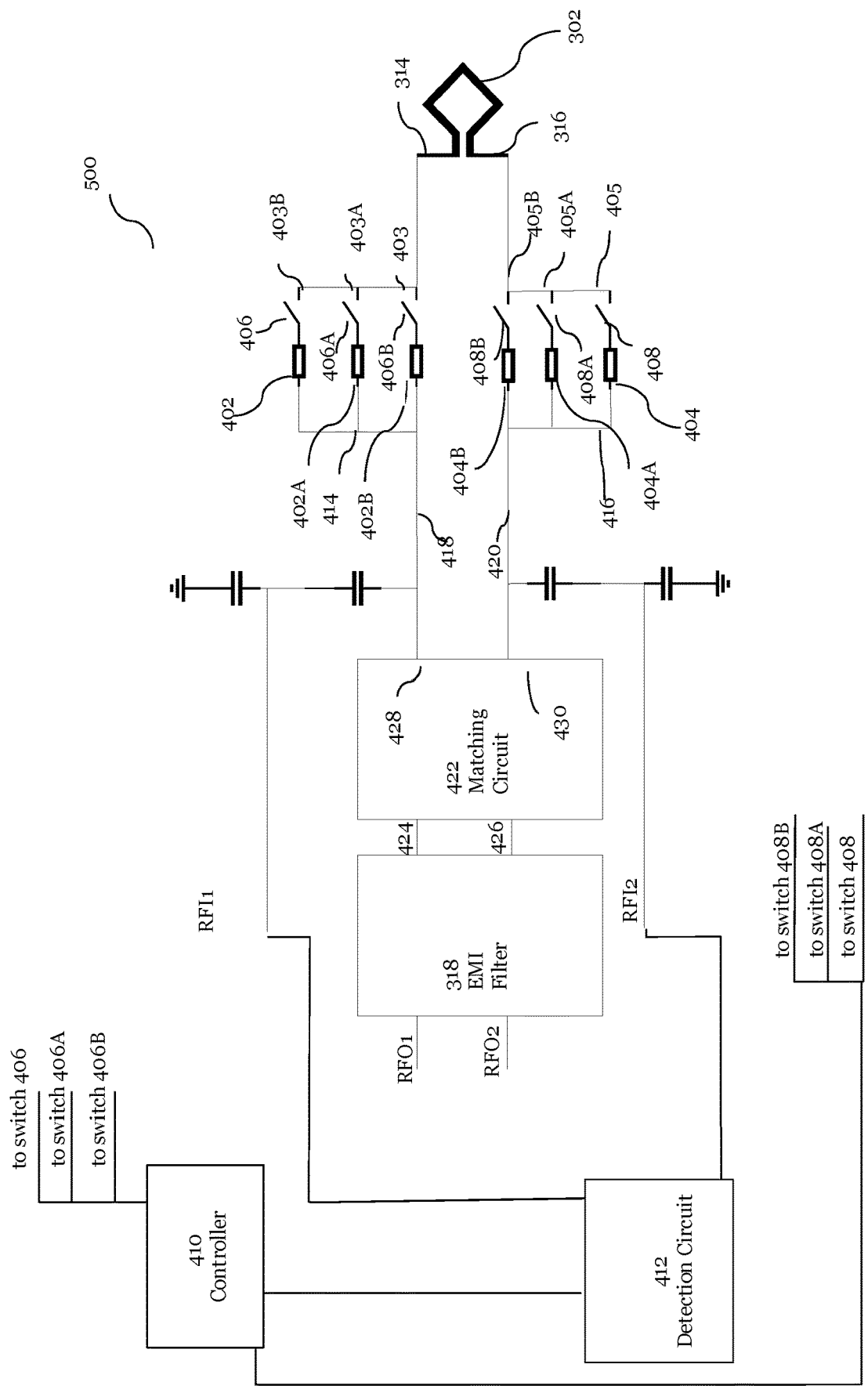
FIG. 5 depicts an embodiment of a circuit that allows the Q factor of an antenna of a reader to be dynamically modified.

FIG. 5 depicts an embodiment of a circuit 500 that allows the value of the Q factor of an antenna 302 of a reader 104 to be dynamically modified. In FIG. 5, first node 414 is coupled with the first output node RFO1. And, the second node 416 is coupled with second output node RFO2. In embodiments where the first output node RFO1 is coupled with first output terminal TX1 of the NFC chip 304, the first current path 403 is in series with a first current transmission path 418 between the first output terminal TX1 and the first terminal 314 of the antenna 302. In embodiments where the second output node RFO2 is coupled with second output terminal TX2 of the NFC chip 304, the second current path 405 is in series with a second current transmission path 420 between the second output terminal TX2 and the second terminal of the antenna 302.

In embodiments like the ones described in the preceding paragraph, the controller 410 may operate the first switch 406 and the second switch 408 to add or remove resistance in series with the antenna 302 to set the value of the Q factor of the antenna 302. Additional resistors and switches may be also be added to the circuit 500 in various embodiments.

Figure 6:
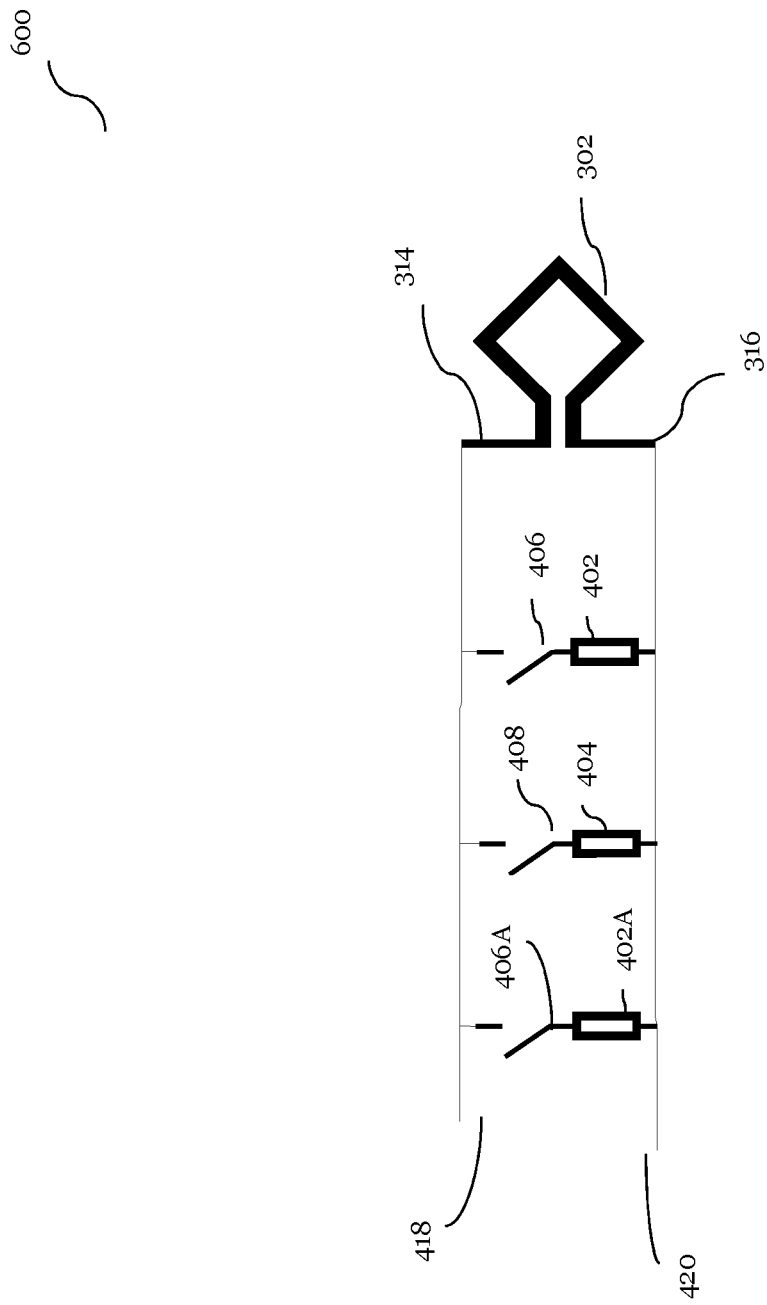
FIG. 6 depicts an embodiment of a circuit that allows the Q factor of an antenna of a reader to be dynamically modified.

FIG. 6 depicts an embodiment of a circuit 600 that allows the value of the Q factor of an antenna 302 of a reader 104 to be dynamically modified. In various embodiments, like the one depicted in FIG. 6, the circuit 600 may comprise a first resistor 402 and a first switch 406 between a first current transmission path 418 that is coupled with the first terminal 314 of the antenna 302. The circuit 600 may further comprise a second current transmission path 420 coupled with the second terminal 316 of the antenna 302. In some embodiments, the first resistor 402, and the first switch 406 may disposed between the first current transmission path 418 and the second current transmission path 420, wherein the first switch 406 is operable to couple the first resistor 402 between the first current transmission path 418 and the second current transmission path 420 in an open state and decouple the first resistor 402 between the first current transmission path 418 and the second current transmission path 420 in a closed state. The controller 410 may be configured to set the value of the Q factor of the antenna 302 to a first value or a second value by operating the first switch 406.

Various embodiments may also comprise a second resistor 404, a third resistor 402A, a second switch 408, and a third switch 406A. The second resistor 404, third resistor 402A, second switch 408, and third switch 406A may be disposed between the first current transmission path 418 and the second current transmission path 420, wherein second switch 408, and third switch 406A are operable to couple, respectively, the second resistor 404 and the third resistor 402A between the first current transmission path 418 and the second current transmission path 420 in an open state. And, in a closed state, they are operable to decouple, respectively, the second resistor 404 and third resistor 402A between the first current transmission path 418 and the second current transmission path 420.

The controller 410 may be configured to set the value of the Q factor of the antenna 302 to additional values by operating the first switch 406, the second switch 408, and the third switch 406A. Additional resistors and switches may be also be added to the circuit 600 in various embodiments.

Figure 7:
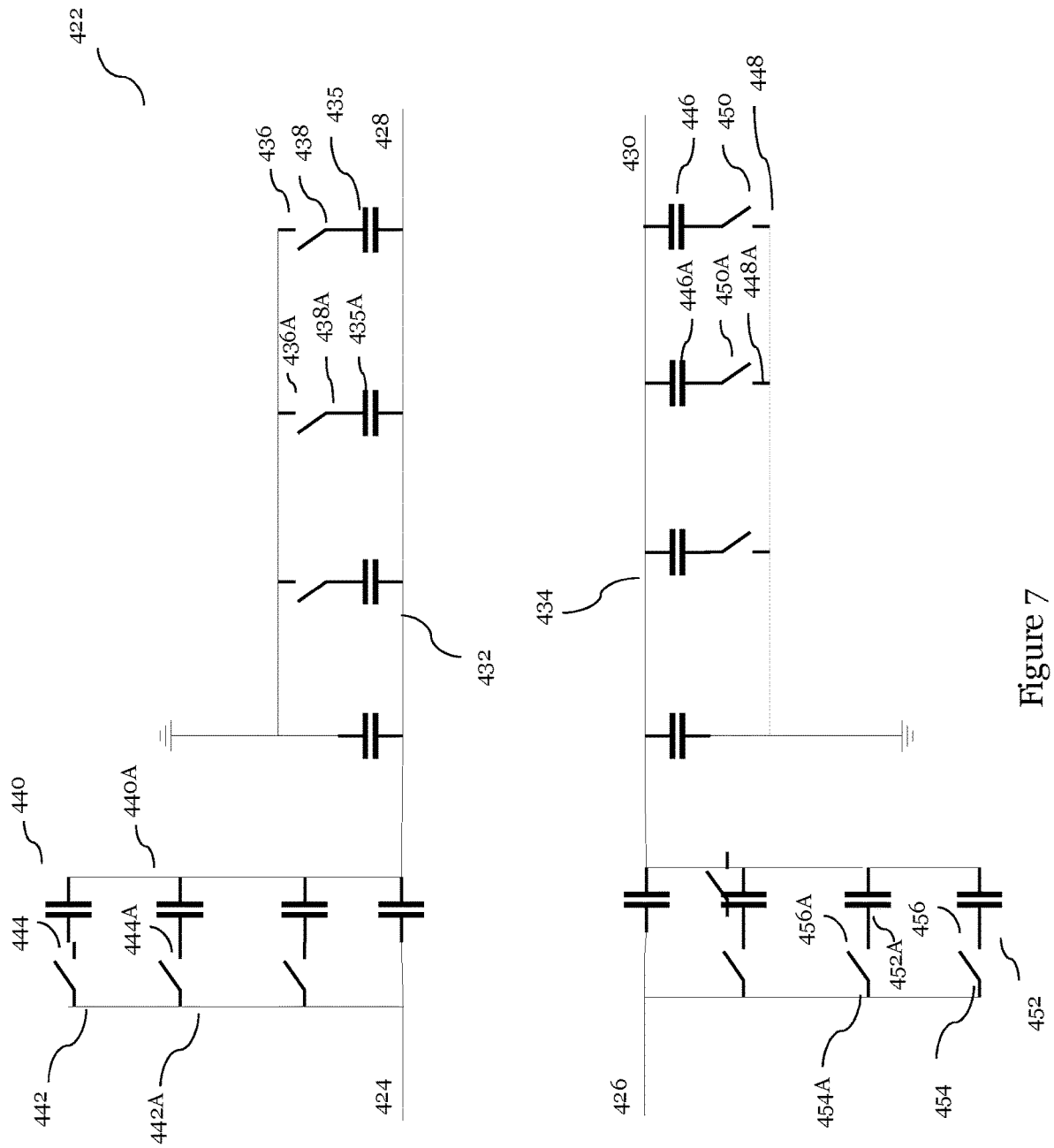
FIG. 7 is an embodiment of a dynamic matching circuit.

FIG. 7 depicts an embodiment a matching circuit 422 that dynamically matches the NFC chip 304 with the antenna 302. In some embodiments, the matching circuit 422 may comprise a first matching current path 432 between the first input matching node 424 and the first output matching node 428. A first parallel capacitor 435 may be disposed on a first parallel path 436 that is coupled to the first matching current path 432 by a first parallel switch 438.

An additional first parallel capacitor 435A may be disposed on an additional first parallel path 436A that is coupled to the first matching current path 432 by an additional first parallel switch 438A. In various, embodiments more first parallel capacitors may be added on more first parallel paths coupled to the first matching current path 432 by more first parallel switches.

The matching circuit 422 may also comprise a first serial parallel capacitor 440 disposed on a first serial path 442 that is coupled to the first matching current path 432 by a first serial switch 444. An additional first serial capacitor 440A may be disposed on an additional first serial path 442A that is coupled to the first matching current path 432 by an additional first serial switch 444A. In various embodiments, additional serial capacitors may be added on additional serial paths coupled to the first matching current path 432 by additional switches.

In various embodiments, the matching circuit 422 may comprise a second matching current path 434 between the second input matching node 426 and the second output matching node 430. A second parallel capacitor 446 may be disposed on a second parallel path 448 that is coupled to the second matching current path 434 by a second parallel switch 450. An additional second parallel capacitor 446A may be disposed on an additional second parallel path 448A that is coupled to the second matching current path 434 by an additional second parallel switch 450A. In various, embodiments more second parallel capacitors may be added on more second parallel paths coupled to the second matching current path 434 by more second parallel switches.

The matching circuit 422 may also comprise a second serial capacitor 452 disposed on a second serial path 454 that is coupled to the second matching current path 434 by a second serial switch 456. An additional second serial capacitor 452A may be disposed on an additional second serial path 454A that is coupled to the second matching current path 434 by an additional second serial switch 456A. In various embodiments, additional second serial capacitors may be added on additional second serial paths coupled to the second matching current path 434 by additional second serial switches.

The controller 410 may be in communication with the first parallel switch 438, first additional parallel switch 438a, the first serial switch 444, the additional first serial switch 444A, the second parallel switch 450, the additional second parallel switch 450A, the second serial switch 456, and the additional second serial switch 456A. The controller 410 may operate the switches to modify the serial and parallel capacitance of the matching circuit 422 to dynamically match the NFC chip 304 with antenna load. It should be appreciated matching circuit 422 may comprise any form known in the art and is not limited the embodiments described above. The matching circuit 422 may be used with any circuit of this disclosure.

Figure 8:
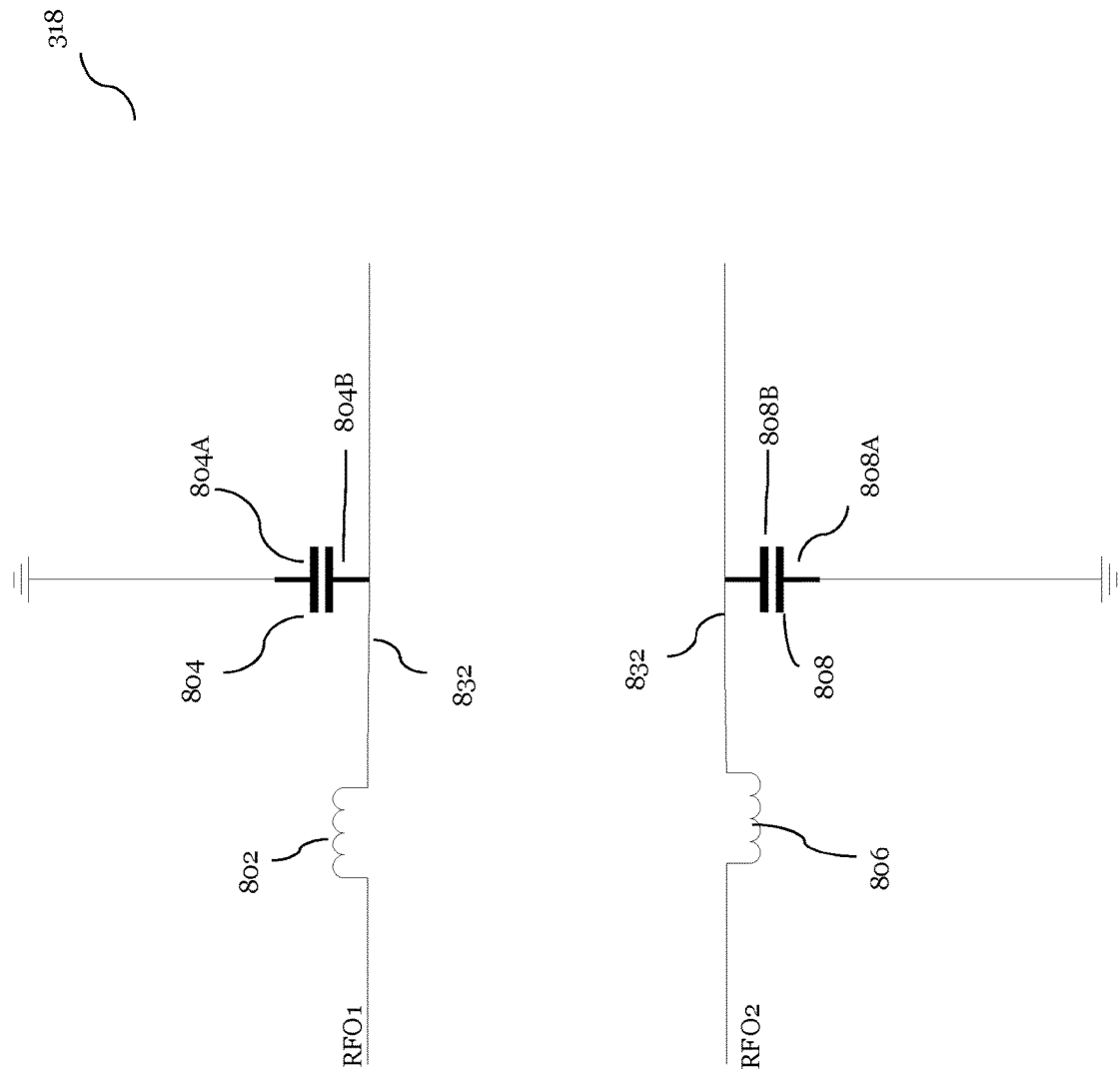
FIG. 8 is an embodiment of an EMI filter.

FIG. 8 illustrates an example embodiment of the EMI filter 318. It should be noted that other embodiments of the EMI filter 318 may comprise different architectures, for example, high pass filters, band pass filters, or low pass filters.

In various embodiments, the EMI filter 318 may comprise a first inductor 802 and a first EMI capacitor 804. In some embodiments, the first EMI capacitor 804 is coupled with a reference potential at a first plate of the first EMI capacitor 804A. The reference potential may comprise a ground in some embodiments. The first EMI capacitor 804 may be coupled with the first inductor 802 at a second plate 804B of the first EMI capacitor 804 of the first EMI capacitor 804.

In various embodiments, the second plate 804B of the first EMI capacitor 804 is also coupled with the first matching current path 432 of the matching circuit 422. In embodiments where the first output node RFO1 is coupled with first output terminal TX1 of the NFC chip 304, the first inductor 802 may be coupled to the first output terminal TX1.

In various embodiments, the EMI filter 318 also comprises a second inductor 806 and a second EMI capacitor 808. In some embodiments, the second EMI capacitor 808 is coupled with a reference potential at a first plate of the second EMI capacitor 808A. The reference potential may comprise a ground in some embodiments. The second EMI capacitor 808 may be coupled with the second inductor 806 at a second plate 808B of the second EMI capacitor 808. In various embodiments, the second plate 808B of the second EMI capacitor 808 is also coupled with the second matching current path 434 of the matching circuit 422. In embodiments where the second output node RFO2 is coupled with second output terminal TX2 of the NFC chip 304, the second inductor 806 may be coupled to the second output terminal TX2.

Figure 9:
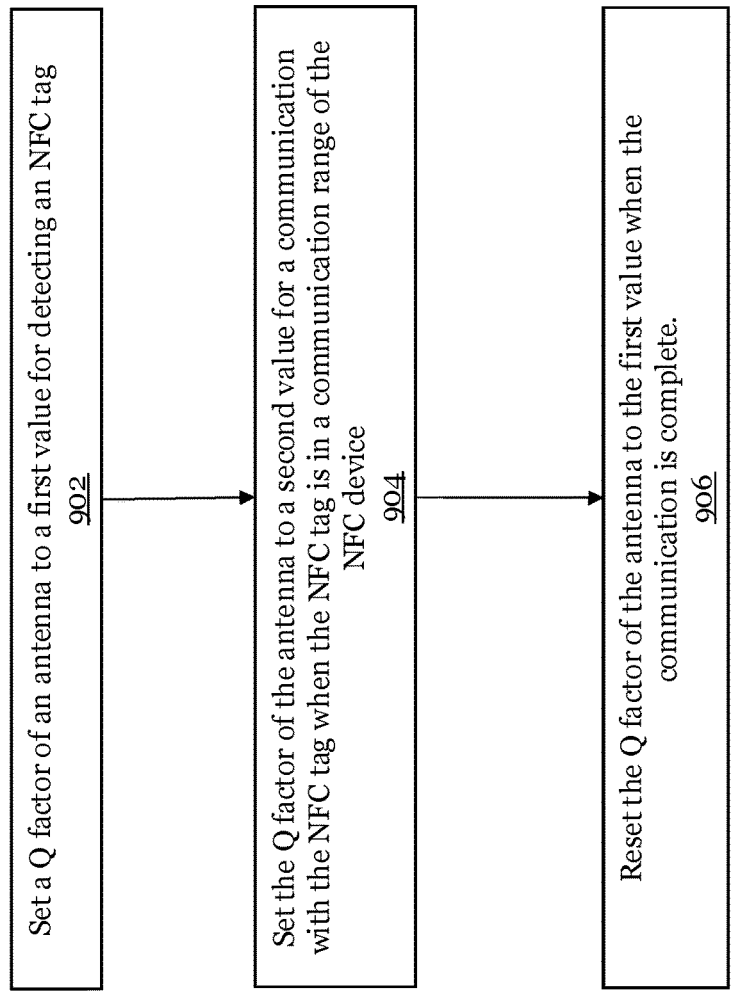
FIG. 9 illustrates a block diagram of a method for conserving power for an NFC device.

FIG. 9 illustrates a block diagram of a method 900 for conserving power for an NFC device. In various embodiments, at a first step 902 the method 900 comprises setting a Q factor of an antenna to a first value for detecting an NFC tag. At a second step 904, the method 900 may comprise setting the Q factor of the antenna to a second value for a communication with the NFC tag when the NFC tag is in a communication range of the NFC device. And, at a third step 906, the method 900 may comprise resetting the Q factor of the antenna to the first value when the communication is complete.

In some embodiments of the method 900, setting the Q factor of the antenna to the second value 904 comprises operating at least one switch to increase a resistance between a first output of an NFC chip and a first terminal of the antenna and to increase a resistance between a second output of the NFC chip and a second terminal of the antenna, the first output being coupled with the first terminal and the second output being coupled with the second terminal.

In some embodiments of the method 900, setting the Q factor of the antenna to the second value 904 further comprises determining a data transmission rate of the communication and corresponding the second value to the data transmission rate.

In some embodiments of the method 900, the data transmission rate is determined at least by a type of the NFC tag wherein the type is one of a group consisting of Type 1, Type 2, Type 3 or Type 4. In some embodiments, some types of NFC tags may allow data transmissions to occur at more than one rate.

In some embodiments of the method 900, the communication is complete when the NFC tag is removed from the communication range. In some embodiments of the method 900, the communication may be complete after predetermined period of time passes.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A near-field communications (NFC) device comprising:
   an antenna comprising a first terminal coupled to a first current path and a second terminal coupled to a second current path;
   a first resistor disposed between a first reference potential node and the first current path;
   a second resistor disposed between a second reference potential node and the second current path;
   a first switch configured to switch between an open state and a closed state, wherein the first switch couples the first current path to the first resistor in the closed state;
   a second switch configured to switch between an open state and a closed state, wherein the second switch couples the second current path to the second resistor in the closed state; and
   a controller in communication with the first switch and the second switch and configured to set a Q factor of the antenna to a first value or a second value by operating the first switch and the second switch.

2. The NFC device of claim 1, further comprising a detection circuit in communication with the controller, wherein the controller is configured to set the Q factor to the second value after an NFC tag is detected by the detection circuit.

3. The NFC device of claim 1, wherein the first terminal of the antenna is coupled with a first output terminal of an NFC chip and a first input terminal of the NFC chip;
   wherein the second terminal of the antenna is coupled with a second output terminal of the NFC chip and a second input terminal of the NFC chip; and
   wherein the NFC device is arranged so that output data is transmitted from the first output terminal and the second output terminal of the NFC chip to the antenna and input data is transmitted from the antenna to the first input terminal and the second input terminal of the NFC chip.

4. The NFC device of claim 3, further comprising an electromagnetic interference filter coupled to the first output terminal of the NFC chip, the second output terminal of the NFC chip, the first terminal of the antenna, and the second terminal of the antenna.

5. The NFC device of claim 3, further comprising a matching circuit coupled to the first output terminal of the NFC chip, the second output terminal of the NFC chip, the first terminal of the antenna, and the second terminal of the antenna.

6. The NFC device of claim 5, wherein the matching circuit comprises a dynamic matching circuit.

7. The NFC device of claim 1, wherein the first current path branches in parallel from a first current transmission path between a first output of an NFC chip and the first terminal of the antenna and the second current path branches in parallel from a second current transmission path between a second terminal output of the NFC chip and the second terminal of the antenna.

8. The NFC device of claim 1, wherein the first reference potential node is coupled with a first output of an NFC chip and the second reference potential node is coupled with a second output of the NFC chip.

9. The NFC device of claim 1, further comprising:
   an additional first resistor on an additional first current path;
   an additional second resistor on an additional second current path;
   an additional first switch configured to switch between an open state and a closed state, wherein the additional first switch couples the additional first current path to the first terminal in the closed state;
   an additional second switch configured to switch between an open state and a closed state, wherein the additional second switch couples the additional second current path to the second terminal in the closed state; and
   wherein the controller in communication with the additional first switch and the additional second switch is configured to set the Q factor of the antenna to the first value, the second value, or an additional value by operating the first switch, the second switch, the additional first switch, and the additional second switch.

10. The NFC device of claim 9, further comprising:
    a detection circuit in communication with the controller; and
    wherein the controller sets the Q factor after an NFC tag has been detected by the detection circuit to the second value or the additional value depending on a type of the NFC tag.

11. The NFC device of claim 9, further comprising:
    a detection circuit in communication with the controller; and
    an NFC chip in communication with the controller, wherein the NFC chip is configured to establish a data transmission rate between the NFC device and an NFC tag when the NFC tag determined to be in communication range by the detection circuit;
    wherein the controller is configured to set the Q factor to the first value when the NFC tag is not in communication range and the controller is configured to set the Q factor to the second value or the additional value when the NFC tag is in communication range depending on the data transmission rate.

12. A near-field communications (NFC) device comprising:
    an antenna comprising a Q factor:
    a first current transmission path coupled with a first terminal of the antenna;

a second current transmission path coupled with a second terminal of the antenna; and a resistor and a switch disposed between the first current transmission path and the second current transmission path, wherein the switch is operable to couple the resistor between the first current transmission path and the second current transmission path in an open state and decouple the resistor between the first current transmission path and the second current transmission path in a closed state, wherein the switch is configured to be controlled to set the Q factor to a first value or a second value.

13. The NFC device of claim 12, wherein the first terminal of the antenna is coupled with a first output terminal of an NFC chip and a first input terminal of the NFC chip, the second terminal of the antenna is coupled with a second output terminal of the NFC chip and a second input terminal of the NFC chip; and wherein NFC device is arranged so that output data is transmitted from the first output terminal and the second output terminal of the NFC chip to the antenna and input data is transmitted from the antenna to the first input terminal and the second input terminal of the NFC chip.

14. The NFC device of claim 13, further comprising an electromagnetic interference filter coupled to the first output terminal of the NFC chip, the second output terminal of the NFC chip, the first terminal of the antenna, and the second terminal of the antenna.

15. The NFC device of claim 13, further comprising a matching circuit coupled to the first output terminal of the NFC chip, the second output terminal of the NFC chip, the first terminal of the antenna, and the second terminal of the antenna.

16. The NFC device of claim 15, wherein the matching circuit comprises a dynamic matching circuit.

17. The NFC device of claim 12, further comprising a detection circuit, wherein the NFC device is configured to operate so the Q factor is set to the second value after an NFC tag is determined, by the detection circuit, to be in a communication range of the NFC device.

18. The NFC device of claim 12, further comprising an additional resistor and an additional switch disposed between the first current transmission path and the second current transmission path, wherein the additional switch is operable to couple the additional resistor between the first current transmission path and the second current transmission path in an open state and decouple the additional resistor between the first current transmission path and the second current transmission path in a closed state, and wherein the Q factor can be set to the first value, the second value, or an additional value by operating the switch and the additional switch.

19. The NFC device of claim 18, further comprising a detection circuit, wherein the NFC device is configured so that the Q factor is set to the second value or the additional value depending on a type of NFC tag detected by the detection circuit.

20. The NFC device of claim 18, further comprising:

a detection circuit; and an NFC chip configured to establish a data transmission rate between the NFC device and an NFC tag when the NFC tag is determined to be in a communication range by the detection circuit, wherein the NFC device is configured so that the Q factor is set to the first value when the NFC tag is not in the communication range and the Q factor is set to the second value or the additional value when the NFC tag is in the communication range depending on the data transmission rate.

21. A method of operating a near-field communications (NFC) device that includes an antenna, the method comprising:

setting a Q factor of the antenna to a first value by operating a switch disposed between a first current transmission path coupled with a first terminal of the antenna and a second current transmission path coupled with a second terminal of the antenna, wherein the switch is operable to couple a resistor between the first current transmission path and the second current transmission path in an open state and decouple the resistor between the first current transmission path and the second current transmission path in a closed state;

detecting an NFC tag while the Q factor of the antenna is set to the first value;

setting the Q factor of the antenna to a value different than the first value after detecting the NFC tag by operating the switch;

communicating with the NFC tag while the Q factor of the antenna is set to the value different than the first value; and resetting the Q factor of the antenna to the first value when the communication is complete.

22. The method of claim 21, wherein setting the Q factor of the antenna to the value different than the first value comprises increasing a resistance between a first output of an NFC chip and the first terminal of the antenna.

23. The method of claim 22, wherein setting the Q factor of the antenna to the value different than the first value further comprises increasing a resistance between a second output of the NFC chip and the second terminal of the antenna.

24. The method of claim 21, wherein setting the Q factor of the antenna to the value different than the first value comprises determining a data transmission rate of the communication and determining the value different than the first value based on the data transmission rate.

* * * * *